Jan. 27, 1970 D. SILVERMAN 3,492,469

OPTICAL SYSTEM FOR AUTO-CORRELATING AND AUTO-CONVOLVING RECORDED SIGNALS

Filed Sept. 12, 1966 5 Sheets-Sheet 1

INVENTOR.
DANIEL SILVERMAN
BY John D. Gassett
ATTORNEY.

Jan. 27, 1970 D. SILVERMAN 3,492,469

OPTICAL SYSTEM FOR AUTO-CORRELATING AND AUTO-CONVOLVING RECORDED SIGNALS

Filed Sept. 12, 1966 5 Sheets-Sheet 2

INVENTOR.
DANIEL SILVERMAN
BY John D. Gassett
ATTORNEY.

INVENTOR.
DANIEL SILVERMAN
BY John D. Gassett
ATTORNEY.

Jan. 27, 1970 D. SILVERMAN 3,492,469

OPTICAL SYSTEM FOR AUTO-CORRELATING AND AUTO-CONVOLVING RECORDED SIGNALS

Filed Sept. 12, 1966 5 Sheets-Sheet 4

INVENTOR.
DANIEL SILVERMAN
BY John D. Gassett
ATTORNEY.

INVENTOR.
DANIEL SILVERMAN
BY
John D. Gassett
ATTORNEY.

3,492,469

OPTICAL SYSTEM FOR AUTO-CORRELATING AND AUTO-CONVOLVING RECORDED SIGNALS

Daniel Silverman, Tulsa, Okla., assignor to Pan American Petroleum Corporation, Tulsa, Okla., a corporation of Delaware Filed Sept. 12, 1966, Ser. No. 578,866
Int. Cl. G06f 15/34; G06g 7/18, 7/16
U.S. Cl. 235—181 35 Claims

ABSTRACT OF THE DISCLOSURE

This invention describes an optical system in which auto-correlation and auto-convolution of a function recorded in the form of a variable density presentation on a photographic transparency record can be carried out by use of a single record. This is accomplished by passing a collimated beam of light twice through the record, shifting its position in the direction of the independent variable before the second passage. By recording two different functions on the record, cross-convolution and cross-correlation can be carried out.

This invention relates to the art of filtering such as a mathematical operation. It relates especially to the art of optical filtering. It is more specially concerned with optical filtering of seismic signals.

This invention concerns a system for performing a mathematical operation upon a signal. In a preferred embodiment, it concerns a system for auto-correlating or autoconvolving a signal recorded upon a single record medium which has a modifying effect upon the incident radiant energy. Means are provided to form a collimated beam of radiant energy directed toward such record medium so that a collimated beam passing through such record medium in a first path is modified in accordance with the characteristics of said first path. Means are provided to redirect the beam of radiant energy modified in a first path to re-intercept the record medium along this same first path. Thus this mathematical operation can be performed using only one record of the signal being processed. The double passage of the radiant energy through the transparency or record medium performs a multiplication of the function recorded on the record medium by itself to form one step of the autocorrelation or autoconvolution process.

Means are provided to shift the path or passage of the modified light beam on its second passage through the record medium in a direction along said first path with respect to the first passage along the first path. This is to provide the time lag or difference $\tau$ which, as will be seen, is required in autocorrelation and autoconvolution. For each value of $\tau$, the signal on the record medium is multiplied by itself shifted in time. Means are provided to obtain the integration of the sum of such multiplications. Such means includes a cylindrical lens for receiving the modified light after it passes through the record medium the second time. The radiant incident energy passes through the cylindrical lens and is directed toward a film. The film is moved in accordance with the change of the path of the modified beam of radiant energy.

The mathematical process of autocorrelation is well known and for convenience can be expressed mathematically as Equation 1

(1) $$\phi_{11}(\tau)=\int_0^T [f_1(t)][f_1(t-\tau)]dt$$

The mathematics for autoconvolution is conveniently given by Equation 2

(2) $$\theta_{11}(\tau)=\int_0^T [f_1(t)][f_1(\tau-t)]dt$$

The systems of autocorrelations and autoconvolutions are especially useful in analyzing seismic sections obtained in seismic exploration. Seismic exploration is a method commonly employed for searching for petroleum or other mineral deposits. In such exploration systems, a seismic disturbance is initiated at a selected point in or near the earth's surface to direct seismic waves downwardly into the earth from that point. The waves continue to travel downwardly within the earth until they encounter discontinuities in the earth structure in the form of various substrata formations and the like. These discontinuities have the effect of reflecting a portion of the seismic waves back toward the surface of the earth. Geophones, which are sensitive pickups, are arranged at a plurality of points along the earth to translate the detected earth motion into electrical impulses which, after suitable amplification, are recorded. The signals recorded then are usually indicative of the character of the ground motion and of the position of the reflecting beds and are usually referred to collectively as a seismic signal, which is in effect made up of a plurality of time spaced signals, varying in frequency and amplitude. When in the form of electrical signals, the signals oscillate about a no signal-or zero voltage-or quiescent record base line. The seismic signal thus detected and recorded is then processed and displayed in various ways. Ordinarily the seismic signals are displayed in a side-by-side relationship on a record medium. Such separate signals are displayed in separate traces in which the traces are relatively narrow, say from 0.005″ to .25″ wide, and are relatively long, such as several feet, for example. The multiplicity of separate signals recorded in contiguous traces is called a "section," which normally may be a record as large as several feet square but which for processing in this invention can be photographically reduced in size to say 1″ square. Many well-known factors determine the best dimensions for such signals. When the signals are so arranged, they give a representation of a cross-section of the earth through the point where the seismic signals were detected.

The seismic signals are commonly recorded as variable-density time functions. Variable density normally means the display of a signal in a manner such that the intensity or photographic density of the display is a function of the amplitude of the seismic signal. As mentioned, each signal of the seismic section is usually displayed in a straight trace or channel of uniform width within the variable-density seismic section.

In a preferred embodiment of this invention, it is the variable-density seismic section which is operated upon optically.

While this invention is primarily directed to the simultaneous autocorrelation and autoconvolution of multi-trace seismic or other variable density sections, I have provided variations and embodiments in which each trace of the section can not only be convolved or correlated with itself, but also with any of the other traces of the section. Extending this feature further, a second function displayed along a second path can be correlated or convolved with any or (simultaneously) with all of the traces of the seismic section. A complete understanding of how this is accomplished and an understanding of the invention and various objects can be had from the following description taken in conjunction with the drawings in which:

Figure 1:
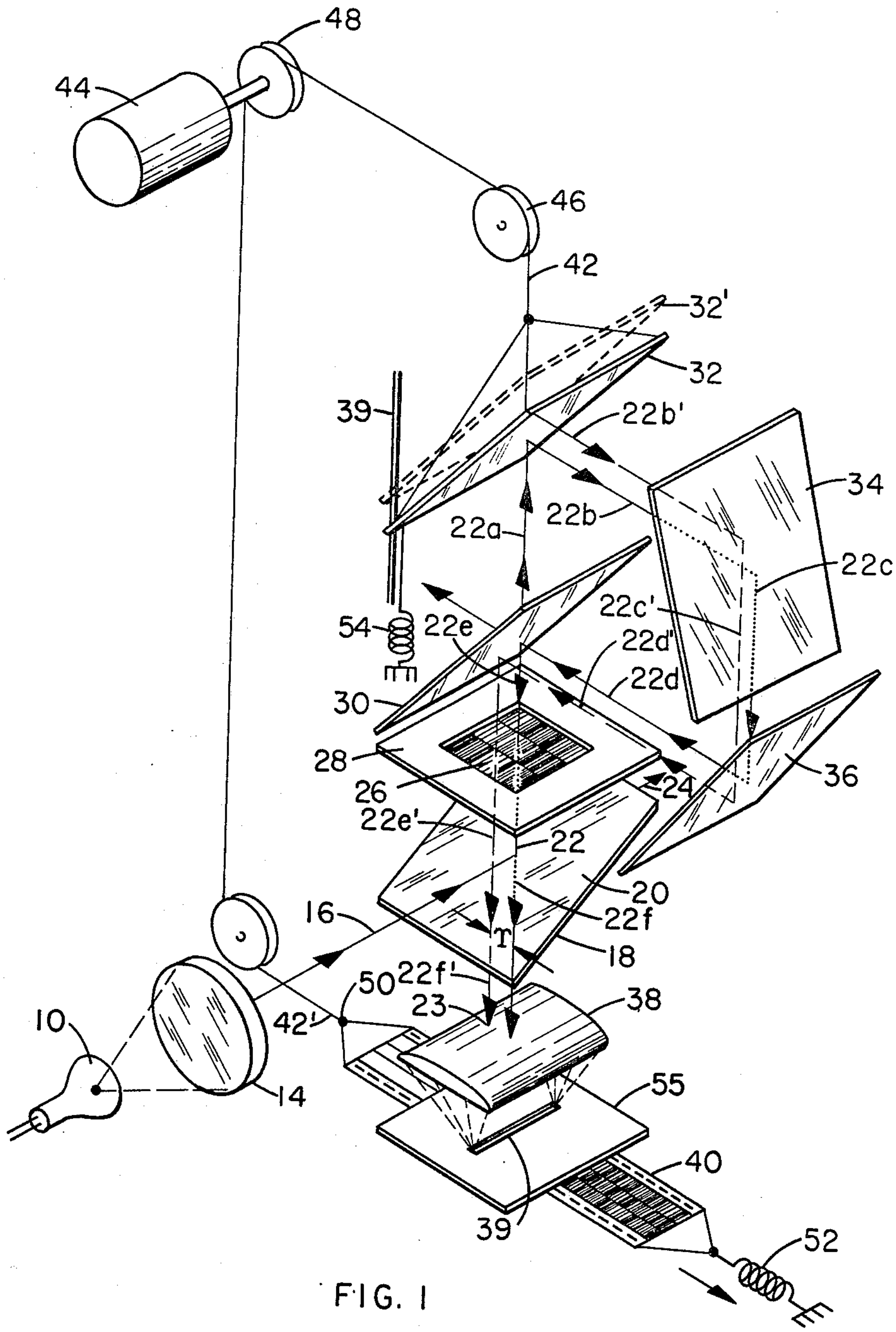
FIGURE 1 is a preferred embodiment for carrying out the present invention.

FIGURE 1 is a perspective view of a preferred embodiment of the invention and is particularly useful in optically autocorrelating a signal. Shown thereon is a light source 10. Radiant energy from such source is directed toward spherical lens 14. The light, or radiant energy beam 16, which leaves spherical lens 14 travels in parallel paths; i.e., the radiant energy leaving lens 14 is a collimated beam of radiant energy. This collimated beam of radiant energy is directed toward a light splitting device 18. This can conveniently take the form of a half-silvered, or partially silvered, mirror which is preferably set at a 45° angle with the plane of the spherical lens. Radiant energy striking the face 20 of mirror 18 is partially reflected upwardly as indicated by line 22 and a part passes through as indicated by line 24, which beam is directed to the black-painted interior surface of a light housing (not shown) which encloses the apparatus of FIGURE 1, where the light is absorbed. It is the path of the radiant energy 22 with which we are concerned. Radiant energy 22 is directed through a transparency 26 which is supported in an opening of mask or shield 28. Transparency 26 is the record medium upon which one or more signals are recorded in the form of separate, parallel traces, and in which the record medium has a modifying effect upon incident radiant energy. A typical record 26 is a so-called variable-density seismic section. This includes a plurality of signals recorded in parallel side-by-side channels commonly called traces. Each trace has varying radiant energy passing characteristics. These characteristics vary from complete transparency for passing one value of a signal to a complete blocking of radiant energy for a different value of that signal. In other words, the radiant energy passing characteristics of the transparency varies along the channel in accordance with an electrical signal, which may be a seismic signal or other time function. The radiant energy which passes through transparency 26 is then seen to be a modified beam of radiant energy.

It is well known in the art that two signals expressed as variable density variations along traces on two transparencies can be correlated by superimposing the two traces, passing collimated light through the two traces in series, integrating the transmitted light over a desired interval along the traces, and displaying a function of this integral as a point value on a record medium. Next, the traces are relatively moved by an amount $\tau$ and the process repeated, an so on. The passage of the light through the first trace modifies the beam in accordance with the first function. The once modified beam is further modified in accordance with the second function, the twice modified beam being modified in accordance with the product of the two functions. This process of repetitive multiplication, integration and recording is exactly what is called for in Equations 1 and 2 on page 3.

One example of the art on optical correlators (convolution and correlation involve the same physical steps, although one of the functions is reversed in time direction between the two processes) is the U.S. Patent 3,204,-248, issued Aug. 31, 1965 to W. A. Alexander. Although his invention differs from this one in that he provides a plurality of displaced images of one function which he multiplies simultaneously, in contrast to my invention in which I make the multiplications sequentially, he does illustrate the multiplicative action of the passage of the optical beam. What the Alexander patent does not show is the convenience of performing autocorrelation and autoconvolution with a single transparency record.

The Alexander patent further illustrates a point which applies equally well to my invention, and that is due to the particular nature of our signals. When the signals to be correlated are A.C. signals, it is necessary, in the preparation of the transparency to bias the A.C. signals with a D.C. signal of value K where K is greater than one-half the peak to peak amplitude of the A.C. signal. This provides a varying unidirectional signal that is always greater than zero, incorporates all of the A.C. information and can be photographically recorded in variable density display. Unfortunately, the introduction of the bias signal K introduces error into the computation.

Consider the convolution $$\int f_1(t) f_2(\tau - t)\,dt \quad (3)$$

When we add the D.C. signal K, this becomes $$\int [K + f_1(t)][K + f_2(\tau - t)]\,dt \quad (4)$$

By performing this multiplication, we get $$\int K^2 dt + K \int [f_1(t) + f_2(\tau - t)]\,dt + \int f_1(t) f_2(\tau - t)\,dt \quad (5)$$

Here, the last expression is the part in which we are interested and the first two expressions are errors.

The first expression is a constant term that only affects the density (or gray level) of the final record. The second term is more troublesome. However, it is well known (see the Alexander patent supra) that by repeating the total operation, but substituting for $K + f_1(t)$ and $$K + f_2(\tau - t)$$

two transparencies of the form $K - f_1(t)$ and $K - f_2(\tau - t)$, respectively, and adding the resulting output record to the original output record, this second interference term will reduce to zero.

This addition can of course be done by using the same output film strip 40 for the two processings. Thus, the darkening of film 40 will be equal at any value of $\tau$ to the sum of the light passing through the integrating lens 38 for each of the two separate transparencies 26. The detailed operation of the apparatus of FIGURE 1 will be further explained. However, it is not felt to be necessary to go any further into the matter of this error problem since its solution is well known in the art.

Means will now be discussed for redirecting this modified beam of radiant energy back through record medium or transparency 26. In the embodiment shown in FIGURE 1, this includes a first mirror 30, a second mirror 32, a third mirror 34, and a fourth mirror 36. Mirror 30 is a partly-silvered mirror similar to mirror 18. One of mirrors 32, 34, and 36 is arranged so it can be moved to a position parallel to its present position. In FIGURE 1, mirror 32 is made to be movable along tracks 39, subject to the restraint of spring 54. Only one track and spring mechanism is shown; however, there should be one for each corner of the mirror. This movement of mirror 32 is synchronized to move according to the movement of a recording medium 40, as will be discussed later.

Energy beam 22a passing upwardly from record 26 passes through mirror 30 to mirror 32 and it is reflected as shown by the solid line segment 22b to mirror 34, line segment 22c, to mirror 36 and line segment 22d toward mirror 30 where a portion 22e of the energy beam is reflected downwardly by the face of mirror 30 to re-intercept record 26. Part of the beam 22d passes through mirror 30, and like beam 24 is lost. Thus it is seen that the modified beam of radiant energy after having passed upwardly through record 26 is redirected back through such record. When the radiant energy passes back through the record 26, that record again exercises a modifying effect upon redirected previously modified radiant energy.

It will be clear that the upwardly directed beam 22a that passes upwardly through the partly-silvered mirror 30 is only a part of the beam 22 that passes upwardly through the transparency 26. The other part of beam 22 is reflected off the mirror 30 to mirror 36, 34 and 32, tracing backward the exact paths 22d, 22c and 22b. It is reflected downward from 32 along and opposite to 22a Part of this downward beam (22e) is reflected off the surface of 30 and is lost, and part goes through 30. Since the two paths described are identical, the two beams will reinforce each other and add to form the downwardly directed beam 22e which passes a second time through the transparancy 26 and downwardly as 22f.

While I have shown four mirrors in FIGURE 1, it is not necessary to use this number. The number may be increased or even reduced to 1, so long as the modified radiant energy is redirected through the transparency 26 as taught herein.

In order to accomplish autocorrelation, it is necessary to move the redirected beam with respect to record 26. As just seen, a double passage of the beam through record 10 performs a multiplication of the function on record 26 by itself. To perform a complete autocorrelation one must shift the redirected beam with respect to the record medium. For each shift, there is a multiplication of the function on the record medium 26 by itself displaced in time. Integration of the multiplications of each unit length of the function is performed by cylindrical lens 38 which is positioned beneath mirror 18 to receive the redirected radiant energy 22f passing downwardly through record 26 to intercept cylindrical lens 38.

In order to provide for multiplications of the record 26 by redirected modified radiant energy in different positions, it is needed to shift the second passage of the radiant energy through record 26 with respect to the first passage in the direction of the time axis, for example, of the individual traces or channels on the transparency. This is to provide the time lag $\tau$. This is accomplished in a drawing by moving mirror 32 along track 38 to a second position, for example, to a position 32′ which is parallel to the position of mirror 32 as shown. This causes the radiant energy beam 22 to be reflected by mirrors 34, 36, and 30 to a second position 23 which, as shown, is indicated by line segments 22b′, 22c′, 22d′, 22e′, and 22f′. As can be seen, the redirected radiant energy is shifted a distance $\tau$ from the position where beam 22 passes through record 26. This movement of mirror 32 is controlled in accordance with the movement of recording medium 40, which records the radiant energy passing through cylindrical lens 38. This is shown schematically as moving mirror 32 by cord 42 by motor 44 over pulleys 46 and 48. Portion 42′ of cord 42 is also attached to recording medium 40 at 50. Movement of the recording medium, which may be a photographic film and the cord is restrained between motor 44 and springs 52 and 54. Thus as motor 44 moves mirror 32 upwardly, stretching spring 54, it releases cord 42′ so that spring 50 can move the recording medium 40. The two springs 52 and 54 serve to take out backlash in the system, causing related movement of the mirror 32 and the record medium 40. The use of cylindrical lens 38 permits integration of all radiant energy along the length of the traces, i.e., longitudinally down the individual traces of the transparency, while radiant energy passing through adjacent channels is not mixed. Thus the record 40 provides as a function of $\tau$, for each of the signals recorded on the transparency, the sum of the product of the signal and itself, repeatedly.

Figure 3:
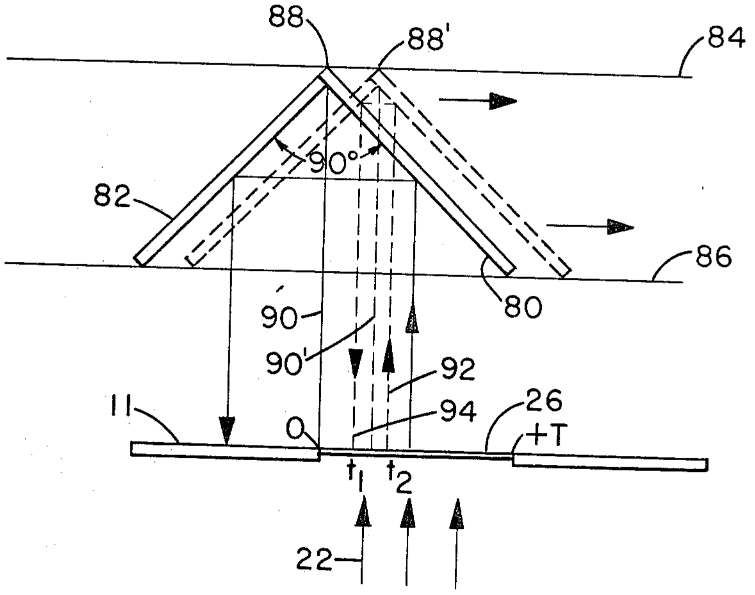
FIGURE 3 illustrates a modification of the mirror arrangement of FIGURE 1, especially for use in performing the autoconvolution process.
Figure 4:
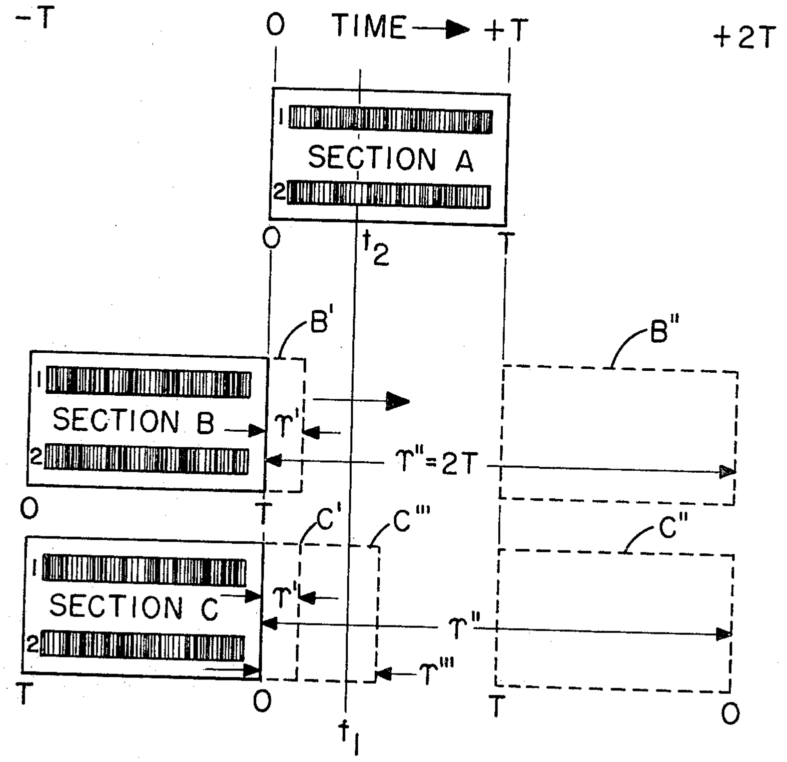
FIGURE 4 illustrates time relationships of a seismic section with itself, which illustration is useful in explaining autocorrelation and autoconvolution.

For a better understanding of the operation of the apparatus illustrated in FIGURE 1, attention is directed to FIGURE 4. FIGURE 4 has illustrated thereon section A, section B, and section C. The X axis goes from −T to O to +2T. Section A is from time O to time T. Section B is identical to section A except that it is moved to the left until its time O occurs at a time of −T. Section C is section A reversed in time. Section C then from left to right goes from time T to time O. Section C is arranged so that time T of the section agrees with the −T of section A. Section C will be considered in conjunction with the description of FIGURE 3. Right now I shall be concerned with sections A and B which are useful in explaining the autocorrelation operation of the apparatus of FIGURE 1. To obtain the first point on the correlation curve, traces 1 of sections A and B are multiplied together by multiplying corresponding vertically aligned portions of each section. (Although each section has many traces, for simplification only one trace of each section will be discussed in this explanation at this time.) This multiplication is obtained in the apparatus in FIGURE 1 being set so that record film 26 is, in fact, section A. Mirror 32 is set at a position so that the redirected, modified incident radiant energy is displaced along the trace so that it just misses striking film 26 on its way back. To provide the time lag $\tau$ as required in Equation 1 above, it is necessary to shift the modified radiant incident energy with respect to film 26. The shifting of section B to its ultimate position is illustrated in FIGURE 4 by dotted outline B′. This is accomplished in the device of FIGURE 1 by moving mirror 32 so as to change the light path as necessary, so that a portion of the redirected light pattern intercepts film 26. Referring to FIGURE 4, more realistically, section B is moved to position B′ where it overlaps section A for a small distance $\tau'$. This is continued until the time O value of section B has been shifted with respect to section A from −T to +T and section is now in the position B″. $\tau$ has varied through a range of 2T. This, then, satisfies requirement of Equation 1 above for a multiplication portion. It is to be noted that the continual movement of mirror 32 provides the many values of $\tau$. The integration of each of the many multiplications is performed by cylindrical lens 38. The integrated value from cylindrical lens 38 is a line of light which exposes film 40. By moving film 40 as the coordinate $\tau$ with the movement of mirror 32, film 40 is exposed by the integration of the multiplication for each of the many values of $\tau$. Cylindrical lens 38 is most important as it permits integration of all light along the traces, while light from adjacent traces is not mixed. Thus all traces in the section are processed at the same time independently of each other. That is, each trace is simultaneously autocorrelated. As stated above and indicated in FIGURE 4, each seismic section is really made of many side-by-side traces. By appropriate masking of the traces so that only one trace is exposed to the radiant incident energy, each such trace can be processed separately. It is also to be understood that photoelectric cells can be substituted for film 40, one cell for each trace. By doing so, an analog current time function is provided for each trace of the sums of the products as a function of $\tau$. This can be recorded on tape or displayed in conventional manner.

Figure 2:
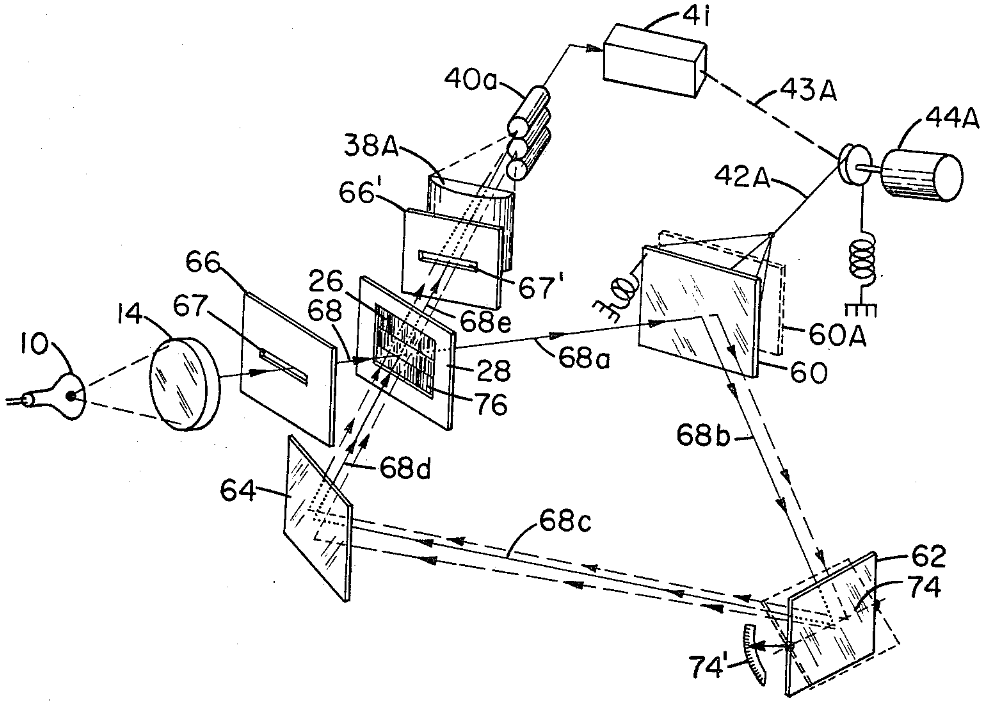
FIGURE 2 is a modification primarily of the mirror arrangement of FIGURE 1 so as to redirect the modified light through the record from the same side as the original light.

In the apparatus embodiment of FIGURE 1, the modified light or image was redirected through the record medium 26 from the opposite side from the source of such radiant energy. FIGURE 2 shows a modification of a mirror arrangement whereby the redirected modified radiant energy passes through the medium 26 from the same side as does the original radiant energy. Shown in FIGURE 2 is record medium 26 and source 10 and lens 14.

(For the moment it will be assumed that light shields 66 and 66' are removed. Its use will be discussed later.) Light passing through medium 26 is reflected by movable mirror 60 toward a rotatable mirror 62 and back toward a fixed mirror 64. The collimated light 68 from light source 10 passes through record 26 at one angle. The redirected modified light **68*d* intercepts the record medium 26 at a different angle. The light 68*e* passing through record 26 the second time then has been modified similarly as the light beam 22*f* passing twice through the same record in FIGURE 1. This light passes through a cylindrical lens 38A and then is recorded on film as in FIGURE 1 or photocells 40A, as illustrated in FIGURE 2, can be used. The outputs of photocells 40A are connected to a recorder 41. The value $\tau$ is injected by moving mirror 60 to positions parallel to itself as indicated by the parallel dashed outline 60A. The exact number and positioning of mirrors 60, 62 and 64 are not critical except that they must be such as to redirect the modified radiant energy through record medium 26 at an angle so that it can be utilized. A further requirement is that one of the mirrors, preferably mirror 60, be movable so as to adjust for the various values of $\tau$ to satisfy the requirements of autocorrelation Equation 1. This is accomplished by moving mirror 60** in accordance with the movement of the recording medium similarly to that of FIGURE 1. For example, motor 44A provides for both such movement through mechanical linkage 42A and 43A.

Each beam 68 corresponding to the light entering one trace of 26 is redirected by the plurality of mirrors and re-enters the same trace of record medium 26. The beam segments 68, **68*a*, 68*b*, 68*c*, 68*d* determine a plane, in which lies the trace of 26 to be correlated. Each of the traces of 26 will have a separate beam and a separate plane. All planes will be parallel because of the collimation of the light by lens 14. Normally there is no transfer of light from one plane to the other, that is the beam modified by trace 1 is redirected back through trace 1**.

However, it is often desirable to correlate two different functions represented by two different traces. For example, if trace 1 is to be correlated with trace 2, the beam **68*a* modified by trace 1 must be redirected back through transparency 26 through trace 2. This is accomplished by shifting the light from plane 1 into plane 2. This is done by rotating one of the mirrors, for example 62, about an axis 74 parallel to the light planes of the several traces. By suitable angle of rotation indicated by index 74', the modified beam from trace 1** can be redirected through any desired trace.

It will be clear, as shown in FIGURE 2, that as mirror 62 is tilted so that light first passing through trace 1 is redirected through trace 2, then light first passing through trace 2 will be redirected through trace 3, and so on. Thus the correlations of trace 1 with trace 2, trace 2 with trace 3, trace 3 with trace 4, etc., will all be performed. If all these correlations are not desired, and only the correlation of trace 1 with trace 2 is desired, then a mask 66 is placed in the path of beam 68. This mask has a slot 67 designed to *pass light* only to a selected trace (trace 1) of the transparency. Conversely, a mask 66' can be placed in the path of the redirected beams passing out of 26 to the cylindrical lens, such that its slot 67' is lined up with the light *leaving* a selected trace (trace 2).

A special case occurs (as will be discussed more fully later) where each of the traces 1, 2, 3, *n* is to be convolved with the same time function (filter operator). In this case the operator trace is repeated as many times as there are traces to be convolved simultaneously. In such case no mask 66 is required.

Figure 5:
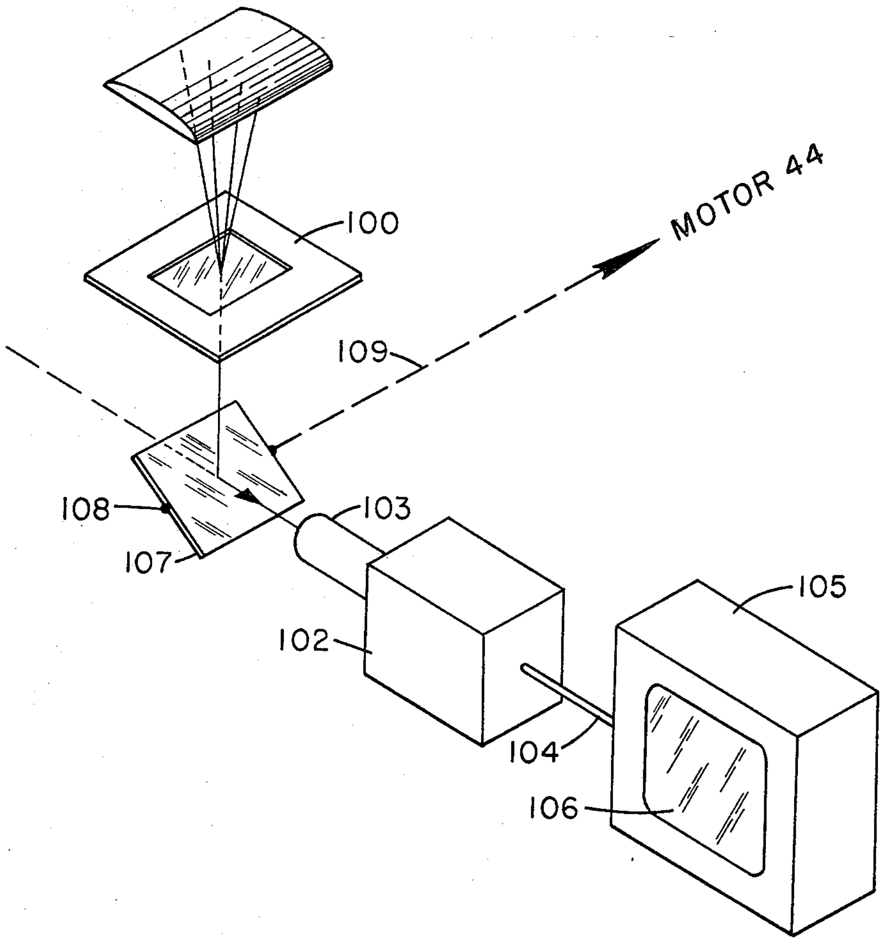
FIGURE 5 illustrates apparatus for immediately viewing the results of the convolution or correlation; and, FIGURE 6 illustrates two parallel records in one plane on one record medium.

Referring back to FIGURE 1, while I have shown that the recording medium 40 is moved under the mask 55 by the spring 52, in true relation to the movement of the mirror 32, it will be clear that the record medium 40 can be stationary, and a rotatable mirror similar to 108 in FIGURE 5 can be driven by cord 42' and spring 52 and made to project the changing images passing through the mask 55 onto the stationary record medium 40. Also, it will be clear that the mirror 32 can be rotated about an axis parallel to the axis of the cylindrical lens 38 instead of being translated parallel to itself, to shift the redirected image **22*e'* along the trace in the transparency 26**.

As another optical operation is sometimes desired also to convolve a signal in accordance with Equation 2, the graphical illustration in FIGURE 4 is helpful in explaining this. In that figure, section C is reversed in time from section A; that is, while section A reads to the right from time O to time T, section C reads to the left from time O to time T. Section C is multiplied by section A in a manner similar to the multiplication of section B by section A. Section C is positioned so that its end of time value T is positioned at −T and it is moved according to the many values of $\tau$ until $\tau$ has been shifted through $\tau'$, $\tau'''$ to a final value of $\tau''=2T$. The process of convolution of section C is similar to the process of correlation of section B except that section C is reversed, end for end, (that is, in the direction of increasing time) compared to section B.

The apparatus of FIGURE 1 is modified so that this can be readily accomplished. The mirrors 30, 32, 34, and 36 in FIGURE 1 are removed. In their place, the mirror configuration illustrated in FIGURE 3 is substituted. This includes a first mirror 80 and a second mirror 82, which are secured together at a 90° included angle, and the plane of each such mirror makes a 45° angle with the plane of record 26. It is of course understood that angles other than 45° can be used. Mirrors 80 and 82 are moved in unison along a horizontal line parallel to film 26. Track means 84 and 86 are provided as guide means, and the mirror combination is connected to line 42 similarly as in FIGURE 1. This is so that the mirror will be moved according to the movement of recording medium 40. Modified incident energy passing upwardly through film 26 strikes mirror 80 and is reflected toward mirror 82 where it is reflected back down toward film 26. The redirected image, or pattern, is in reverse time order to that of record 26. This agrees with the requirement of Equation 2 and is illustrated in the above discussion in regard to FIGURE 4. By moving mirrors 80 and 82, we obtain the many values of the time shift $\tau$. The integration of these many multiplications are obtained by cylindrical lens 38 similarly as described above.

At the start of the convolution process, apex 88 of the mirror assembly 80, 82 is positioned in line with the O time positon of record 26. That is, vertical axis 90 of the mirror assembly is at the edge of the mask 26. In this position light beam 22 passing vertically up through record 26 strikes mirror 80, is reflected horizontally to mirror 82 and thence downward vertically to mask 26. This is the situation where (as in FIGURE 4) the O time value of section C is aligned exactly with the O time value of section A; that is, *no light* passes through *both* sections (or *twice* through the record 26).

Consider the mirror assembly moving to the right so that point 88 is now 88'. The vertical axis 90 of the mirror now has moved to position 90'. Consider ray of light 92 (part of beam 22) moving vertically upward to mirror 80, to mirror 82 and downward as ray 94. Ray 92 starts at time $t_2$ on the record trace and returns as trace 94 at time $t_1$. Time value $t_2>t_1$. This is confirmed by FIGURE 4 where line 92 represents the pencil of light passing through time $t_2$ in section A and lesser time $t_1$ on section C. Similarly, there is a pencil of light that traverses the reverse path of 94, 92. There are a plurality of rays like 92, 94 which traverse the overlapped areas of sections A and C as section C traverses over section A. The mirror assembly 80, 82 not only reduces the light beam back through record 26 and by its movement introduces the varying values of $\tau$, but it also (in effect) turns the section over, end-for-end, to provide the proper geometry for convolution. The mirrors, by their movement, cause the inverted section (section C) to traverse over section A, the multiplications being performed simultaneously.

In FIGURE 1, I show how the light (22f′) passing down through the record 26 is collected by cylindrical lens 38 and focussed (in the $\tau$ direction) to a point, the successive traces (along the axis of the lens) forming additional points, or, in effect, a line of light. This line represents the value of the sum of the multiplications of corresponding traces of the section 26 for a given value of $\tau$. As $\tau$ is varied, the film strip is moved and a record is made of the values of the integrated products for all values of $\tau$, which is the correlation desired.

In practice, it may be desirable for the operator to observe the correlation as soon as it has been (or while it is being) made. He can do this, as in FIGURE 2, by properly displaying the electrical signals from the array of photocells 40A, as is well known in the art.

Another way to accomplish this is illustrated in schematic form in FIGURE 5, which represents a modification of the bottom portion of FIGURE 1. In place of the film strip 40, which in FIGURE 1 is shown below the slit 39 of mask 55 through which the light from the cylindrical lens is focussed, I place a ground glass or other diffusing translucent sheet 100. A closed circuit TV assembly includes a camera 102 with lens 103. The output of camera 102 goes by leads 104 to TV display 105 having viewing screen 106.

The camera views the diffuser 100 by means of a mirror 107 rotating on axis 108. The rotation of mirror 107 is controlled by means 109 from the motor 44 to be correlated with the movement of mirror 32. Thus the rotation of mirror 107 sweeps the image on diffuser 100 as a function of $\tau$. The retention of the image on screen 106 will permit the operator to view on screen 106 the two-dimensional picture that would be recorded on film strip 40.

It was pointed out in connection with FIGURE 2 how the tilting of mirror 62 about axis 74 permits the operator of this apparatus to pass the modified beam through one trace to be redirected through a different trace. Both traces can be from the same section, or from different sections positioned side by side, with traces parallel.

Figure 6:
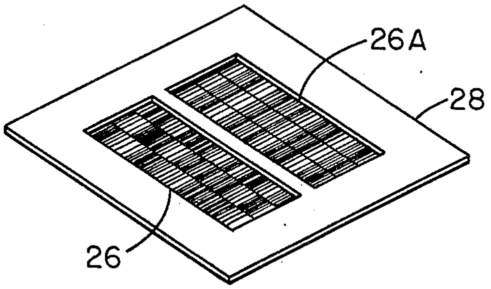

Going a step further, the second section can be an artificial section, with all traces alike. This second section can then represent a convolution operator which, by the operation of this apparatus, is convolved simultaneously with each trace of the section. This is illustrated in FIGURE 6 where the mask 28 of FIGURE 2 is shown modified to have two side-by-side openings displaying transparencies 26 and 26A. Transparency 26 is the multitrace seismic section to be filtered, while 26A is a multitrace filter operator which is to be convolved with the traces of 26. In general, all traces of 26A will be alike since all traces of the section will be filtered with the same operator. However, there are cases of special filters where the adjacent traces of the operator 26A are not necessarily alike.

While it is possible to have both transparencies 26, 26A as part of the same record means, it is preferred to have the operator section 26A separate from, and removable with respect to the seismic section 26. Thus different filter 26A operators can be inserted into the mask 28 to be convolved with the seismic section.

While the above embodiments of the invention have been described with considerable detail, it is to be understood that various modifications of the device can be made without departing from the scope or spirit of the invention.

I claim:

1. A system for performing the mathematical operations of correlation and convolution upon a function which comprises:

(a) a record means upon which at least one function is recorded, said function comprising a single variable displayed along a principal axis X at different values of X, said record means having a modifying effect on incident radiant energy;

(b) means, including a source of radiant energy, to form a single collimated beam of radiant energy directed toward said record means so that a single modified collimated beam emerges from said record means, the cross section of said beam having substantial dimension along the axis X;

(c) directing means to redirect the single modified beam of radiant energy to reintercept said record means, such directing means including means for moving the path of said single modified beam with respect to said record means to a plurality of successive positions along the X axis such that said modified beam reintercepts the record means at a plurality of positions different from that from which it emerged;

(d) means to integrate said redirected radiant energy after it repasses through said record means; and (e) means to utilize said integrated radiant energy as a function of the position along the X axis of the redirected beam.

2. A system as defined in claim 1 wherein said record medium includes a plurality of longitudinal parallel traces, said traces parallel to the X axis.

3. A system as defined in claim 1 wherein said reflector means includes a first partially-silvered mirror positioned in a plane making a first angle with the plane of said record medium, a second mirror parallel to said partially-silvered mirror and spaced therefrom, a third mirror positioned in a plane intersecting the plane of said second mirror at 90°, and a fourth mirror positioned in a plane making a 90° angle with the plane of said third mirror, and parallel to said first mirror.

4. A system as in claim 20 wherein said reflector means includes means for moving at least one of said reflector means in a movement of translation, parallel to itself so as to cause the energy emerging from a specific trace to reintercept the same trace in varying longitudinal relations to said trace on said record medium.

5. A system as defined in claim 2, including means for moving at least one of said reflector means to redirect modified radiant energy emerging from a particular trace on said record medium to reintercept a different longitudinal trace on said medium.

6. A system as defined in claim 1 wherein said means to form a collimated beam of radiant energy comprises a light source and a spherical lens positioned in the path of light from said light source to said record, and including a partially-silvered mirror receiving radiant energy from said spherical lens and positioned to make an angle $\beta$ with the plane of the spherical lens, said partially-silvered mirror positioned such that its plane intersects the plane of said record medium at said angle $\beta$, a cylindrical lens on the side of said partially-silvered mirror opposite said record medium, the plane of said cylindrical lens intercepting the plane of said partially-silvered mirror at an angle complementary to said angle $\beta$, further the plane of said cylindrical lens being parallel to the plane of said record medium.

7. A system as defined in claim 1 wherein said means to utilize said integrated redirected radiant energy after repassing through said record medium includes a radiant energy sensitive recording medium and means to move said recording medium in accordance with the said means for moving the path of said modified beam.

8. A system as defined in claim 6 wherein said angle $\beta$ equals 45°.

9. A system as defined in claim 1 wherein said means to utilize said redirected integrated radiant energy after it re-passes through said record means includes photoelectric sensor means adapted to intercept said redirected integrated radiant energy and means to display the output signal from said sensor means.

10. A system as defined in claim 9 in which said sensor means comprises a plurality of photosensitive elements in a linear array along the axis of said integrating means.

11. A system as defined in claim 1 in which said directing means includes means for reversing the X-axis of said modified energy record before it reintercepts said record means.

12. A system as defined in claim 11 wherein said means to reverse said pattern includes at least two reflector means, the plane of one making an angle of 90° with the plane of the other and at least one of said means arranged to receive modified radiant energy emerging from said record medium, and at least the other arranged to redirect such modified energy back through said record means.

13. A system as defined in claim 1 wherein said means to utilize said redirected integrated radiant energy after it re-passes through said record means includes closed circuit television means to make a visual display of the integrated radiant energy.

14. A system as defined in claim 12 in which said at least two reflector means make angles of 45° with the plane of said record means.

15. A system as defined in claim 1 in which said directing means includes at least a first reflector means adapted to receive modified radiant energy from said record means, at least a second reflector means adapted to receive radiant energy reflected from said first reflector means, said first and at least a second reflector means positioned on opposite sides of the plane of said record means, said second reflector means being arranged so as to redirect the radiant energy reflected from said first reflector means through said record medium; said at least two reflector means and said record medium defining a first plane, and further including means to move at least one of said mirrors.

16. A system as defined in claim 15, including axis means perpendicular to the plane of one of said reflector means about which to rotate one of such reflector means.

17. A system as defined in claim 15 wherein said means to move at least one of said reflector means includes means for moving said reflector means to a second plane, parallel to the original plane.

18. A system as defined in claim 15, including axis means in the plane of one of said reflectors.

19. A system as defined in claim 2, wherein said reflector means includes a plurality of mirrors and including means for rotating one of said mirrors about its axis to vary its tilt so that the redirected energy representing one longitudinal channel of said record medium intercepts another longitudinal channel on reintercepting such record medium.

20. A system as defined in claim 2 wherein said directing means comprises reflector means arranged such as to redirect said modified beam so that the redirected energy emerging from a particular longitudinal trace on said record medium reintercepts that same longitudinal trace on said record medium.

21. A system as defined in claim 2 wherein said directing means comprises reflector means arranged such as to redirect said modified beam so that the redirected energy emerging from a particular longitudinal trace on said record medium reintercepts a different longitudinal parallel trace on said record medium.

22. A system as in claim 21 wherein said reflector means includes axis means for moving at least one of said reflector means in a movement of rotation about said axis, so as to cause the energy emerging from a specific trace to reintercept a different trace.

23. A system for performing the mathematical operations of correlation and convolution which comprises:

(a) a record medium upon which at least one function is recorded on a first path in a form having a modifying effect on incident radiant energy in accordance with said function, (b) means including a source of light to form a collimated beam of radiant energy directed toward said record medium so that said beam intersects said medium along said first path and is modified in its passage through said medium in accordance with said function to form a single modified beam, (c) means to redirect said single modified beam so that it reintercepts said record medium a second time, in a plurality of positions along said first path, (d) means to vary the position at which said redirected single modified beam reintercepts said medium, (e) means to integrate said radiant energy after its second passage through said medium, and (f) means to utilize said integrated radiant energy as a function of the position of said redirected beam along said first path.

24. The system as defined in claim 23 in which said means to redirect said single modified beam so that it reintercepts said record medium a second time comprises means to direct said single modified beam through said medium in a direction opposite to that of the original beam.

25. The system as in claim 23 in which said means to redirect said single modified beam so that it reintercepts said record medium a second time comprises means to direct said single modified beam through said medium in the same direction as the original beam.

26. The system as in claim 24 in which said function comprises a plurality of component signals, each of which is recorded in a separate trace, said plurality of traces being parallel to each other, and in which said beam of radiant energy intercepts a plurality of said traces, and further, in which said redirected single modified beam intersects said medium such that the portion of the beam modified by a first trace intercepts said medium along a second trace.

27. The system as in claim 26, including a mask having at least one slit to limit the width of the collimated beam in a direction perpendicular to said traces.

28. The system as in claim 26 in which the said means to integrate said radiant energy includes cylindrical lens means.

29. The system as in claim 23 in which the said integrated means to utilize said radiant energy includes radiant energy sensitive recording material.

30. The system as in claim 23 in which said means to utilize said integrated radiant energy includes photoelectric sensor means and means to display the output signal from said sensor means.

31. The system as in claim 23 in which said means to redirect said modified beam includes a plurality of mirrors, and said means to vary the position of said redirected beam includes means to move at least one of said mirrors.

32. The system as in claim 23 in which said radiant energy comprises luminous energy.

33. A system as defined in claim 23 wherein said means to redirect said single modified beam includes means for reversing the image pattern of said modified beam when it re-intersects said medium the second time.

34. A system as defined in claim 23 in which said record medium comprises a sheet-like medium in a single plane.

35. The system as in claim 23 in which said means to utilize said redirected integrated radiant energy after it re-passes through said record means includes closed circuit television means to make a visual display of the integrated radiant energy.

References Cited

UNITED STATES PATENTS

| | | | |
|---|---|---|---|
| 3,030,021 | 4/1962 | Ferre | 235—181 |
| 3,204,248 | 8/1965 | Alexander | 235—181 X |
| 3,358,149 | 12/1967 | Preikschat | 250—219 |
| 3,390,257 | 6/1968 | Lohman | 235—181 |

OTHER REFERENCES

Cutrona et al.: Data Processing By Optical Techniques, 1959 Conference Proceedings (Milit. Electr.), June 1959, pages 23–26.

MALCOLM A. MORRISON, Primary Examiner

FELIX D. GRUBER, Assistant Examiner

U.S. Cl. X.R.

235—194, 183; 250—219; 346—108; 356—71; 340—15.5